(12) United States Patent
Taniyama

(10) Patent No.: US 7,535,658 B2
(45) Date of Patent: *May 19, 2009

(54) IMAGING LENS

(75) Inventor: Minoru Taniyama, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,081

(22) Filed: Oct. 31, 2007

(65) Prior Publication Data

US 2008/0180817 A1 Jul. 31, 2008

Related U.S. Application Data

(63) Continuation of application No. 11/528,477, filed on Sep. 28, 2006, now Pat. No. 7,295,386.

(30) Foreign Application Priority Data

Sep. 29, 2005 (JP) ............... P2005-283947
Jun. 13, 2006 (JP) ............... P2006-163875

(51) Int. Cl.
*G02B 9/34* (2006.01)
(52) U.S. Cl. ............... 359/772; 359/771
(58) Field of Classification Search ............... 359/754, 359/755, 757, 758, 763, 764, 766, 771–774
See application file for complete search history.

(56) References Cited

U.S. PATENT DOCUMENTS

| 6,476,982 | B1 | 11/2002 | Kawakami |
| 7,274,518 | B1 | 9/2007 | Tang et al. |
| 7,295,386 | B2* | 11/2007 | Taniyama ............... 359/772 |
| 7,345,830 | B2* | 3/2008 | Shinohara ............... 359/772 |
| 2004/0212901 | A1 | 10/2004 | Nanba et al. |
| 2007/0146901 | A1 | 6/2007 | Noda |

FOREIGN PATENT DOCUMENTS

| JP | 3-59609 | A | 3/1991 |
| JP | 10-48516 | A | 2/1998 |
| JP | 2002-221659 | A | 8/2002 |
| JP | 2004-302057 | A | 10/2004 |
| JP | 2004325713 | A2 | 11/2004 |
| JP | 2005-4027 | A | 1/2005 |
| JP | 2005-4028 | A | 1/2005 |
| JP | 2005-24581 | A | 1/2005 |
| JP | 2005-164899 | A | 6/2005 |
| JP | 2005-208236 | A | 8/2005 |
| KR | 10-2005-0015712 | A | 2/2005 |

* cited by examiner

*Primary Examiner*—Darryl J Collins
(74) *Attorney, Agent, or Firm*—Birch, Stewart, Kolasch & Birch, LLP

(57) ABSTRACT

An imaging lens is provided and includes: in order from an object side of the imaging lens, a first lens having a convex surface on the object side and having a positive power; a second lens having a concave surface on the object side and having a negative power; a third lens having a positive power; and a fourth lens having a convex surface on the object side near a paraxial axis and having a meniscus shape. The imaging lens satisfies conditional expressions specified in the specification.

17 Claims, 28 Drawing Sheets

| EXAMPLE 1/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | −0.20 | | |
| *1 | 1.962 | 1.19 | 1.471 | 76.6 |
| *2 | 33.398 | 0.93 | | |
| *3 | −2.182 | 0.75 | 1.603 | 27.5 |
| *4 | −6.367 | 0.10 | | |
| *5 | 5.794 | 0.89 | 1.510 | 56.2 |
| *6 | 9.192 | 0.16 | | |
| *7 | 1.674 | 0.85 | 1.510 | 56.2 |
| *8 | 1.509 | 0.70 | | |
| 9 | 0.000 | 0.30 | 1.516 | 64.1 |
| 10 | 0.000 | 0.64 | | |

(*ASPHERIC)    (f=5.57, FNO.=2.8, bf=1.53, TL=6.41, Ih=3.5)

FIG. 11

| EXAMPLE 1/ASPHERIC DATA | | | | |
|---|---|---|---|---|
| ASPHERIC COEFFICIENT | SURFACE NUMBER | | | |
| | FIRST | SECOND | THIRD | FOURTH |
| K | 2.153E+00 | 4.018E+01 | 2.105E+00 | 3.382E+00 |
| $A_3$ | -1.895E-02 | -4.966E-03 | -4.388E-02 | -1.131E-01 |
| $A_4$ | 2.426E-02 | -1.434E-02 | -2.555E-02 | -7.863E-02 |
| $A_5$ | -5.123E-02 | -6.139E-03 | 5.160E-02 | 1.094E-01 |
| $A_6$ | 8.371E-04 | -9.284E-05 | -4.307E-02 | 6.228E-03 |
| $A_7$ | 7.850E-03 | 6.438E-03 | -2.831E-02 | -2.216E-02 |
| $A_8$ | 4.091E-03 | -5.720E-03 | 3.162E-02 | -5.890E-03 |
| $A_9$ | -7.732E-03 | -2.385E-02 | 4.630E-02 | 4.123E-03 |
| $A_{10}$ | -4.265E-03 | 1.108E-02 | -4.877E-02 | 1.041E-03 |
| | FIFTH | SIXTH | SEVENTH | EIGHTH |
| K | -2.211E+02 | 9.331E-01 | -7.617E+00 | -2.707E+00 |
| $A_3$ | -7.876E-02 | 9.694E-03 | 7.429E-02 | 1.767E-03 |
| $A_4$ | 7.020E-02 | -2.516E-03 | -6.933E-02 | -4.652E-02 |
| $A_5$ | 5.175E-03 | -3.606E-03 | -5.811E-03 | 1.625E-02 |
| $A_6$ | -9.958E-03 | -2.497E-04 | 2.396E-03 | -3.522E-03 |
| $A_7$ | -7.322E-03 | -6.840E-04 | 2.100E-03 | -7.106E-04 |
| $A_8$ | 6.914E-04 | -1.414E-04 | -3.119E-04 | 3.825E-04 |
| $A_9$ | 2.540E-03 | 2.932E-04 | -5.552E-05 | 6.271E-05 |
| $A_{10}$ | -7.650E-04 | -7.284E-05 | 7.969E-06 | -2.631E-05 |

FIG. 12

| EXAMPLE 2/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | 0.00 | | |
| *1 | 2.160 | 1.10 | 1.542 | 62.9 |
| *2 | 16.201 | 0.88 | | |
| *3 | -2.397 | 0.71 | 1.603 | 27.5 |
| *4 | -10.131 | 0.10 | | |
| *5 | 6.105 | 0.90 | 1.510 | 56.2 |
| *6 | 19.366 | 0.16 | | |
| *7 | 1.715 | 0.85 | 1.510 | 56.2 |
| *8 | 1.669 | 0.70 | | |
| 9 | 0.000 | 0.30 | 1.516 | 64.1 |
| 10 | 0.000 | 0.83 | | |

(*ASPHERIC)  (f=5.49, FNO.=2.8, bf=1.73, TL=6.44, Ih=3.5)

FIG. 13

| EXAMPLE 2/ASPHERIC DATA | | | | |
|---|---|---|---|---|
| ASPHERIC COEFFICIENT | SURFACE NUMBER | | | |
| | FIRST | SECOND | THIRD | FOURTH |
| K | 2.077E+00 | -1.160E+01 | 1.956E+00 | -1.494E+00 |
| $A_3$ | -7.649E-03 | 7.995E-04 | -5.126E-02 | -1.016E-01 |
| $A_4$ | 1.695E-02 | -1.450E-02 | -8.743E-03 | -7.649E-02 |
| $A_5$ | -4.681E-02 | -1.536E-03 | 6.090E-02 | 1.122E-01 |
| $A_6$ | 6.776E-03 | -1.327E-02 | -3.937E-02 | 8.310E-03 |
| $A_7$ | 1.090E-02 | 1.716E-02 | -3.033E-02 | -2.091E-02 |
| $A_8$ | 2.307E-03 | -5.126E-03 | 2.544E-02 | -5.406E-03 |
| $A_9$ | -9.049E-03 | -2.327E-02 | 4.225E-02 | 4.044E-03 |
| $A_{10}$ | -3.648E-04 | 1.042E-02 | -4.146E-02 | 3.974E-04 |
| | FIFTH | SIXTH | SEVENTH | EIGHTH |
| K | -1.981E+02 | 2.864E-01 | -7.617E+00 | -2.707E+00 |
| $A_3$ | -7.495E-02 | 3.023E-03 | 8.698E-02 | 1.615E-02 |
| $A_4$ | 7.132E-02 | -1.313E-03 | -6.743E-02 | -4.919E-02 |
| $A_5$ | 4.108E-03 | -3.160E-03 | -5.632E-03 | 1.664E-02 |
| $A_6$ | -9.759E-03 | 6.861E-05 | 2.382E-03 | -3.494E-03 |
| $A_7$ | -7.280E-03 | -7.743E-04 | 2.082E-03 | -7.034E-04 |
| $A_8$ | 7.736E-04 | -1.825E-04 | -3.167E-04 | 3.881E-04 |
| $A_9$ | 2.588E-03 | 2.859E-04 | -5.773E-05 | 6.193E-05 |
| $A_{10}$ | -7.568E-04 | -7.131E-05 | 7.998E-06 | -2.654E-05 |

FIG. 14

| EXAMPLE 3/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | -0.16 | | |
| *1 | 1.948 | 0.90 | 1.592 | 68.3 |
| *2 | 9.999 | 0.80 | | |
| *3 | -1.925 | 0.59 | 1.604 | 27.2 |
| *4 | -6.492 | 0.11 | | |
| *5 | 6.217 | 0.66 | 1.510 | 56.2 |
| *6 | 20.578 | 0.15 | | |
| *7 | 1.399 | 0.70 | 1.510 | 56.2 |
| *8 | 1.441 | 0.70 | | |
| 9 | 0.000 | 0.30 | 1.516 | 64.1 |
| 10 | 0.000 | 0.73 | | |

(*ASPHERIC)  (f=4.76, FNO.=2.8, bf=1.63, TL=5.53, Ih=2.9)

FIG. 15

| EXAMPLE 3/ASPHERIC DATA | | | | |
|---|---|---|---|---|
| ASPHERIC COEFFICIENT | SURFACE NUMBER | | | |
| | FIRST | SECOND | THIRD | FOURTH |
| K | 2.153E+00 | 4.018E+01 | 2.105E+00 | 3.382E+00 |
| $A_3$ | -3.226E-02 | -9.097E-03 | -7.770E-02 | -1.389E-01 |
| $A_4$ | 7.995E-02 | -1.949E-02 | -9.859E-03 | -1.206E-01 |
| $A_5$ | -9.382E-02 | -7.959E-03 | 1.389E-01 | 2.242E-01 |
| $A_6$ | -4.859E-02 | 3.896E-04 | -8.564E-02 | 1.777E-02 |
| $A_7$ | -1.676E-02 | 1.469E-02 | -9.350E-02 | -6.023E-02 |
| $A_8$ | 8.074E-02 | -2.080E-02 | 7.209E-02 | -1.833E-02 |
| $A_9$ | 1.276E-01 | -9.120E-02 | 1.642E-01 | 1.595E-02 |
| $A_{10}$ | -1.544E-01 | 6.076E-02 | -1.737E-01 | 1.589E-03 |
| | FIFTH | SIXTH | SEVENTH | EIGHTH |
| K | -2.211E+02 | 9.331E-01 | -7.617E+00 | -2.707E+00 |
| $A_3$ | -1.030E-01 | -1.121E-02 | 1.131E-01 | 2.208E-02 |
| $A_4$ | 1.165E-01 | -1.583E-03 | -1.116E-01 | -8.812E-02 |
| $A_5$ | 1.276E-02 | -4.034E-03 | -1.101E-02 | 3.345E-02 |
| $A_6$ | -2.206E-02 | 8.135E-04 | 5.557E-03 | -7.097E-03 |
| $A_7$ | -1.973E-02 | -1.640E-03 | 5.804E-03 | -1.661E-03 |
| $A_8$ | 2.674E-03 | -4.422E-04 | -1.076E-03 | 1.287E-03 |
| $A_9$ | 1.031E-02 | 1.210E-03 | -2.232E-04 | 2.108E-04 |
| $A_{10}$ | -3.570E-03 | -3.105E-04 | 4.713E-05 | -1.533E-04 |

FIG. 16

| EXAMPLE 4/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | −0.16 | | |
| *1 | 1.694 | 1.00 | 1.471 | 76.6 |
| *2 | 15.313 | 0.88 | | |
| *3 | −1.678 | 0.62 | 1.603 | 27.5 |
| *4 | −4.608 | 0.10 | | |
| *5 | 6.466 | 0.66 | 1.510 | 56.2 |
| *6 | 13.071 | 0.15 | | |
| *7 | 1.376 | 0.65 | 1.510 | 56.2 |
| *8 | 1.412 | 0.70 | | |
| 9 | 0.000 | 0.30 | 1.516 | 64.1 |
| 10 | 0.000 | 0.81 | | |

(*ASPHERIC)    (f=5.12, FNO.=3.0, bf=1.70, TL=5.76, Ih=2.9)

FIG. 17

| EXAMPLE 4/ASPHERIC DATA | | | | |
|---|---|---|---|---|
| ASPHERIC COEFFICIENT | SURFACE NUMBER | | | |
| | FIRST | SECOND | THIRD | FOURTH |
| K | 2.153E+00 | 6.956E+01 | 1.786E+00 | 3.843E+00 |
| $A_3$ | -1.795E-02 | -6.098E-03 | -8.898E-02 | -1.445E-01 |
| $A_4$ | 3.346E-02 | -1.389E-02 | 3.639E-03 | -1.279E-01 |
| $A_5$ | -9.585E-02 | -1.165E-02 | 1.287E-01 | 2.218E-01 |
| $A_6$ | 6.039E-03 | -8.086E-04 | -9.646E-02 | 1.611E-02 |
| $A_7$ | 2.193E-02 | 2.197E-02 | -9.322E-02 | -6.199E-02 |
| $A_8$ | 1.448E-02 | -1.124E-02 | 8.572E-02 | -1.960E-02 |
| $A_9$ | -2.807E-02 | -8.860E-02 | 1.810E-01 | 1.597E-02 |
| $A_{10}$ | -1.444E-02 | 5.110E-02 | -1.833E-01 | 3.549E-03 |
| | FIFTH | SIXTH | SEVENTH | EIGHTH |
| K | -2.274E+02 | -8.743E+00 | -7.513E+00 | -2.863E+00 |
| $A_3$ | -1.024E-01 | 6.787E-03 | 1.128E-01 | 1.419E-02 |
| $A_4$ | 1.136E-01 | -9.491E-04 | -1.124E-01 | -8.785E-02 |
| $A_5$ | 9.913E-03 | -6.606E-03 | -1.132E-02 | 3.424E-02 |
| $A_6$ | -2.363E-02 | -9.050E-04 | 5.605E-03 | -7.542E-03 |
| $A_7$ | -2.066E-02 | -2.340E-03 | 5.894E-03 | -1.862E-03 |
| $A_8$ | 2.159E-03 | -6.595E-04 | -1.072E-03 | 1.298E-03 |
| $A_9$ | 1.008E-02 | 1.137E-03 | -2.260E-04 | 2.377E-04 |
| $A_{10}$ | -3.687E-03 | -3.387E-04 | 3.935E-05 | -1.366E-04 |

FIG. 18

| Si (SURFACE NUMBER) | Ri (CURVATURE RADIUS) | Di (SURFACE SPACING) | Ndj (REFRACTIVE INDEX) | νdj (ABBE NUMBER) |
|---|---|---|---|---|
| EXAMPLE 5/FUNDAMENTAL LENS DATA | | | | |
| St | (STOP) | -0.16 | | |
| *1 | 1.176 | 0.91 | 1.471 | 76.6 |
| *2 | 105.876 | 0.71 | | |
| *3 | -1.956 | 0.57 | 1.606 | 27 |
| *4 | -4.706 | 0.08 | | |
| *5 | 5.651 | 0.64 | 1.510 | 56.2 |
| *6 | 12.837 | 0.10 | | |
| *7 | 1.317 | 0.72 | 1.510 | 56.2 |
| *8 | 1.195 | 0.70 | | |
| 9 | 0.000 | 0.30 | 1.516 | 64.1 |
| 10 | 0.000 | 0.39 | | |

(*ASPHERIC)    (f=4.12, FNO.=2.80, bf=1.29, TL=5.02, Ih=2.915)

FIG. 19

| EXAMPLE 5/ASPHERIC DATA | | | | |
|---|---|---|---|---|
| ASPHERIC COEFFICIENT | SURFACE NUMBER | | | |
| | FIRST | SECOND | THIRD | FOURTH |
| K | 2.024E+00 | 9.007E+00 | 1.949E+00 | 3.869E+00 |
| $A_3$ | -1.069E-02 | -6.151E-03 | -4.835E-02 | -1.321E-01 |
| $A_4$ | 1.400E-02 | -1.072E-02 | -1.492E-02 | -1.233E-01 |
| $A_5$ | -8.996E-02 | -2.339E-02 | 1.250E-01 | 2.137E-01 |
| $A_6$ | 2.201E-02 | -1.031E-02 | -8.870E-02 | 1.439E-02 |
| $A_7$ | 2.843E-02 | 2.398E-02 | -9.393E-02 | -5.751E-02 |
| $A_8$ | 5.824E-03 | -2.192E-04 | 7.492E-02 | -1.556E-02 |
| $A_9$ | -4.154E-02 | -7.956E-02 | 1.729E-01 | 1.710E-02 |
| $A_{10}$ | -1.006E-02 | 3.173E-02 | -1.675E-01 | 2.968E-03 |
| | FIFTH | SIXTH | SEVENTH | EIGHTH |
| K | -9.931E+00 | -1.006E+01 | -5.774E+00 | -3.605E+00 |
| $A_3$ | -1.395E-01 | 2.296E-02 | 6.596E-02 | 4.130E-02 |
| $A_4$ | 1.018E-01 | -9.538E-03 | -1.015E-01 | -9.472E-02 |
| $A_5$ | 9.765E-03 | -8.943E-03 | -6.508E-03 | 3.453E-02 |
| $A_6$ | -2.148E-02 | -7.400E-04 | 6.586E-03 | -6.514E-03 |
| $A_7$ | -1.925E-02 | -2.115E-03 | 5.706E-03 | -2.007E-03 |
| $A_8$ | 2.515E-03 | -7.027E-04 | -1.162E-03 | 1.160E-03 |
| $A_9$ | 9.570E-03 | 1.063E-03 | -2.739E-04 | 1.996E-04 |
| $A_{10}$ | -4.452E-03 | -2.718E-04 | 3.764E-05 | -1.196E-04 |

FIG. 20

| EXAMPLE 6/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | -0.12 | | |
| *1 | 1.178 | 0.86 | 1.471 | 76.6 |
| *2 | -30.725 | 0.67 | | |
| *3 | -1.775 | 0.55 | 1.606 | 27 |
| *4 | -4.378 | 0.07 | | |
| *5 | 4.172 | 0.71 | 1.510 | 56.2 |
| *6 | 42.982 | 0.09 | | |
| *7 | 1.307 | 0.70 | 1.510 | 56.2 |
| *8 | 1.098 | 0.70 | | |
| 9 | 0.000 | 0.30 | 1.516 | 64.1 |
| 10 | 0.000 | 0.31 | | |

(*ASPHERIC)   (f=3.80, FNO.=2.8, bf=1.21, TL=4.86, Ih=2.915)

FIG. 21

| EXAMPLE 6/ASPHERIC DATA | | | | |
|---|---|---|---|---|
| ASPHERIC COEFFICIENT | SURFACE NUMBER | | | |
| | FIRST | SECOND | THIRD | FOURTH |
| K | 1.919E+00 | 1.001E+01 | 1.437E+00 | 1.400E+00 |
| $A_3$ | -6.793E-03 | -7.538E-03 | -4.497E-02 | -1.305E-01 |
| $A_4$ | 3.109E-03 | -1.254E-02 | 5.173E-04 | -1.176E-01 |
| $A_5$ | -8.295E-02 | -2.605E-02 | 1.359E-01 | 2.178E-01 |
| $A_6$ | 3.674E-02 | -1.036E-02 | -7.928E-02 | 1.635E-02 |
| $A_7$ | 3.147E-02 | 2.521E-02 | -8.879E-02 | -5.636E-02 |
| $A_8$ | -1.182E-02 | 1.177E-03 | 7.573E-02 | -1.477E-02 |
| $A_9$ | -6.433E-02 | -7.982E-02 | 1.172E-01 | 1.761E-02 |
| $A_{10}$ | -1.755E-02 | 2.543E-02 | -1.696E-01 | 3.221E-03 |
| $A_{11}$ | - | - | -9.745E-04 | 5.907E-05 |
| $A_{12}$ | - | - | 7.201E-04 | -6.596E-05 |
| $A_{13}$ | - | - | 2.047E-03 | -1.263E-04 |
| $A_{14}$ | - | - | 2.114E-03 | -1.365E-04 |
| $A_{15}$ | - | - | 3.018E-04 | -1.140E-04 |
| $A_{16}$ | - | - | -3.797E-03 | -7.218E-05 |
| | FIFTH | SIXTH | SEVENTH | EIGHTH |
| K | -8.922E+00 | -1.000E+01 | -5.326E+00 | -3.202E+00 |
| $A_3$ | -1.350E-01 | 4.652E-02 | 6.296E-02 | 3.735E-02 |
| $A_4$ | 1.027E-01 | -1.397E-02 | -9.781E-02 | -9.254E-02 |
| $A_5$ | 9.023E-03 | -9.990E-03 | -5.796E-03 | 3.633E-02 |
| $A_6$ | -2.160E-02 | -6.547E-04 | 6.870E-03 | -6.333E-03 |
| $A_7$ | -1.916E-02 | -1.922E-03 | 5.743E-03 | -2.121E-03 |
| $A_8$ | 2.632E-03 | -5.522E-04 | -1.141E-03 | 1.124E-03 |
| $A_9$ | 9.695E-03 | 1.101E-03 | -2.782E-04 | 1.820E-04 |
| $A_{10}$ | -4.339E-03 | -2.711E-04 | 3.408E-05 | -1.233E-04 |
| $A_{11}$ | 7.391E-05 | -9.978E-06 | -1.012E-06 | 4.583E-07 |
| $A_{12}$ | 3.400E-05 | -6.436E-06 | -8.337E-07 | 2.820E-07 |
| $A_{13}$ | 5.848E-06 | -2.948E-06 | -2.142E-07 | 1.514E-07 |
| $A_{14}$ | -8.367E-06 | -7.849E-07 | -1.840E-08 | 7.566E-08 |
| $A_{15}$ | -1.309E-05 | 9.997E-08 | 3.335E-09 | 2.261E-08 |
| $A_{16}$ | -1.268E-05 | 3.445E-07 | 2.954E-08 | 8.222E-09 |

FIG. 22

| EXAMPLE 7/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | 0.05 | | |
| *1 | 1.769 | 0.86 | 1.471 | 76.6 |
| *2 | 2486.572 | 0.68 | | |
| *3 | -1.907 | 0.55 | 1.606 | 27 |
| *4 | -4.113 | 0.07 | | |
| *5 | 4.086 | 0.67 | 1.510 | 56.2 |
| *6 | 18.065 | 0.09 | | |
| *7 | 1.300 | 0.69 | 1.510 | 56.2 |
| *8 | 1.083 | 0.70 | | |
| 9 | 0.000 | 0.30 | 1.516 | 64.1 |
| 10 | 0.000 | 0.33 | | |

(*ASPHERIC)     (f=3.80, FNO.=2.8, bf=1.23, TL=4.84, Ih=2.915)

FIG. 23

| EXAMPLE 7/ASPHERIC DATA | | | | |
|---|---|---|---|---|
| ASPHERIC COEFFICIENT | SURFACE NUMBER | | | |
| | FIRST | SECOND | THIRD | FOURTH |
| K | 1.958E+00 | -1.000E+01 | 1.469E+00 | 1.131E+00 |
| $A_3$ | -7.234E-03 | -3.465E-03 | -4.039E-02 | -1.268E-01 |
| $A_4$ | 5.393E-03 | -9.127E-03 | 7.124E-04 | -1.168E-01 |
| $A_5$ | -8.124E-02 | -2.306E-02 | 1.347E-01 | 2.181E-01 |
| $A_6$ | 3.637E-02 | -7.856E-03 | -8.089E-02 | 1.655E-02 |
| $A_7$ | 2.983E-02 | 2.734E-02 | -9.017E-02 | -5.623E-02 |
| $A_8$ | -1.290E-02 | 3.079E-03 | 7.497E-02 | -1.472E-02 |
| $A_9$ | -6.247E-02 | -7.807E-02 | 1.711E-01 | 1.759E-02 |
| $A_{10}$ | 2.492E-02 | 2.703E-02 | -1.689E-01 | 3.168E-03 |
| $A_{11}$ | - | 1.306E-03 | 1.107E-04 | -8.541E-06 |
| $A_{12}$ | - | 9.161E-04 | 1.986E-03 | -1.258E-04 |
| $A_{13}$ | - | 4.882E-04 | 3.281E-03 | -1.669E-04 |
| $A_{14}$ | - | -4.156E-05 | 3.056E-03 | -1.527E-04 |
| $A_{15}$ | - | -6.158E-04 | 7.481E-04 | -1.035E-04 |
| $A_{16}$ | - | -1.224E-03 | -3.967E-03 | -3.875E-05 |
| | FIFTH | SIXTH | SEVENTH | EIGHTH |
| K | -7.864E+00 | 1.002E+01 | -5.292E+00 | -3.079E+00 |
| $A_3$ | -1.355E-01 | 5.050E-02 | 6.359E-02 | 3.500E-02 |
| $A_4$ | 1.043E-01 | -1.344E-02 | -9.702E-02 | -9.299E-02 |
| $A_5$ | 1.082E-02 | -1.042E-02 | -5.564E-03 | 3.653E-02 |
| $A_6$ | -2.081E-02 | -7.915E-04 | 6.923E-03 | -6.240E-03 |
| $A_7$ | -1.908E-02 | -1.884E-03 | 5.752E-03 | -2.092E-03 |
| $A_8$ | 2.574E-03 | -4.986E-04 | -1.138E-03 | 1.132E-03 |
| $A_9$ | 9.663E-03 | 1.133E-03 | -2.777E-04 | 1.851E-04 |
| $A_{10}$ | -4.336E-03 | -2.583E-04 | 3.421E-05 | -1.222E-04 |
| $A_{11}$ | 9.338E-05 | -4.205E-06 | -9.335E-07 | 7.361E-07 |
| $A_{12}$ | 5.722E-05 | -4.420E-06 | -8.137E-07 | 3.556E-07 |
| $A_{13}$ | 2.682E-05 | -2.417E-06 | -2.044E-07 | 1.835E-07 |
| $A_{14}$ | 8.696E-06 | -7.136E-07 | -1.374E-08 | 8.400E-08 |
| $A_{15}$ | 1.510E-07 | 4.009E-08 | 4.225E-09 | 2.207E-08 |
| $A_{16}$ | -2.613E-06 | 2.716E-07 | 2.977E-08 | 8.199E-09 |

FIG. 24

| EXAMPLE 8/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | -0.16 | | |
| *1 | 1.689 | 1.00 | 1.471 | 76.6 |
| *2 | 14.850 | 0.83 | | |
| *3 | -1.790 | 0.60 | 1.604 | 27 |
| *4 | -3.825 | 0.10 | | |
| *5 | 8.003 | 0.67 | 1.510 | 56.2 |
| *6 | 9.870 | 0.15 | | |
| *7 | 1.353 | 0.68 | 1.510 | 56.2 |
| *8 | 1.399 | 0.70 | | |
| 9 | 0.000 | 0.30 | 1.516 | 64.1 |
| 10 | 0.000 | 0.72 | | |

(*ASPHERIC)   (f=4.92, FNO.=3.0, bf=1.61, TL=5.65, Ih=2.9)

FIG. 25

| EXAMPLE 8/ASPHERIC DATA | | | | |
|---|---|---|---|---|
| ASPHERIC COEFFICIENT | SURFACE NUMBER | | | |
| | FIRST | SECOND | THIRD | FOURTH |
| $K$ | 2.153E+00 | 4.018E+01 | 2.105E+00 | 3.382E+00 |
| $A_3$ | -1.850E-02 | -4.085E-03 | -1.024E-01 | -1.400E-01 |
| $A_4$ | 3.539E-02 | -1.616E-02 | 7.653E-03 | -1.261E-01 |
| $A_5$ | -9.972E-02 | -1.120E-02 | 1.332E-01 | 2.221E-01 |
| $A_6$ | 5.278E-03 | -1.347E-03 | -9.431E-02 | 1.613E-02 |
| $A_7$ | 2.448E-02 | 2.041E-02 | -9.068E-02 | -6.199E-02 |
| $A_8$ | 1.784E-02 | -1.348E-02 | 9.013E-02 | -1.952E-02 |
| $A_9$ | -2.696E-02 | -9.050E-02 | 1.845E-01 | 1.621E-02 |
| $A_{10}$ | -1.800E-02 | 5.190E-02 | -1.926E-01 | 3.988E-03 |
| | FIFTH | SIXTH | SEVENTH | EIGHTH |
| $K$ | -2.211E+02 | 9.331E-01 | -7.617E+00 | -2.707E+00 |
| $A_3$ | -1.009E-01 | -7.234E-04 | 1.120E-01 | 1.405E-02 |
| $A_4$ | 1.140E-01 | -1.833E-03 | -1.130E-01 | -8.742E-02 |
| $A_5$ | 9.739E-03 | -6.425E-03 | -1.143E-02 | 3.415E-02 |
| $A_6$ | -2.380E-02 | -7.347E-04 | 5.593E-03 | -7.564E-03 |
| $A_7$ | -2.073E-02 | -2.253E-03 | 5.897E-03 | -1.858E-03 |
| $A_8$ | 2.163E-03 | -6.420E-04 | -1.068E-03 | 1.304E-03 |
| $A_9$ | 1.013E-02 | 1.127E-03 | -2.230E-04 | 2.410E-04 |
| $A_{10}$ | -3.609E-03 | -3.535E-04 | 4.138E-05 | -1.348E-04 |

FIG. 26

| EXAMPLE 9/FUNDAMENTAL LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| St | (STOP) | -0.16 | | |
| *1 | 1.745 | 0.89 | 1.471 | 76.6 |
| *2 | -53.775 | 0.69 | | |
| *3 | -2.133 | 0.54 | 1.606 | 27 |
| *4 | 252.895 | 0.07 | | |
| *5 | 4.001 | 0.71 | 1.510 | 56.2 |
| *6 | 165.253 | 0.09 | | |
| *7 | 1.331 | 0.85 | 1.510 | 56.2 |
| *8 | 1.269 | 0.70 | | |
| 9 | 0.000 | 0.30 | 1.516 | 64.1 |
| 10 | 0.000 | 0.38 | | |

(*ASPHERIC)   (f=4.15, FNO.=2.8, bf=1.28, TL=5.12, Ih=2.915)

FIG. 27

| EXAMPLE 9/ASPHERIC DATA ||||
|---|---|---|---|---|
| ASPHERIC COEFFICIENT | SURFACE NUMBER ||||
| | FIRST | SECOND | THIRD | FOURTH |
| K | 1.955E+00 | 9.972E+00 | 1.962E+00 | -5.579E+04 |
| $A_3$ | -5.327E-03 | -1.241E-02 | -6.145E-02 | -1.786E-01 |
| $A_4$ | -4.451E-03 | -5.103E-03 | -4.302E-02 | -1.257E-01 |
| $A_5$ | -7.406E-02 | -2.493E-02 | 1.481E-01 | 2.152E-01 |
| $A_6$ | 4.328E-02 | -2.322E-02 | -6.121E-02 | 1.437E-02 |
| $A_7$ | 2.304E-02 | 1.510E-02 | -9.732E-02 | -5.593E-02 |
| $A_8$ | -2.633E-02 | 1.370E-02 | 4.933E-02 | -1.349E-02 |
| $A_9$ | -6.696E-02 | -5.269E-02 | 1.549E-01 | 1.755E-02 |
| $A_{10}$ | 3.380E-02 | 3.281E-03 | -1.473E-01 | 7.869E-04 |
| | FIFTH | SIXTH | SEVENTH | EIGHTH |
| K | -9.816E+00 | -9.875E+00 | -4.732E+00 | -3.418E+00 |
| $A_3$ | -1.353E-01 | 4.321E-02 | 4.365E-02 | 4.242E-02 |
| $A_4$ | 9.098E-02 | -1.702E-02 | -9.128E-02 | -1.011E-01 |
| $A_5$ | 4.898E-03 | -1.088E-02 | -3.675E-03 | 4.117E-02 |
| $A_6$ | -1.887E-02 | 7.168E-06 | 6.923E-03 | -6.172E-03 |
| $A_7$ | -1.729E-02 | -1.519E-03 | 5.455E-03 | -2.459E-03 |
| $A_8$ | 3.071E-03 | -6.694E-04 | -1.346E-03 | 9.779E-04 |
| $A_9$ | 9.400E-03 | 9.525E-04 | -3.263E-04 | 1.858E-04 |
| $A_{10}$ | -5.157E-03 | -3.190E-04 | 6.607E-05 | -9.145E-05 |

FIG. 28

| | CONDITIONAL EXPRESSION (1) f1/f | CONDITIONAL EXPRESSION (2) n1 | CONDITIONAL EXPRESSION (3) ν1 | CONDITIONAL EXPRESSION (4) \|f2/f\| | CONDITIONAL EXPRESSION (5) f3/f | CONDITIONAL EXPRESSION (6) bf/TL | CONDITIONAL EXPRESSION (7) TL/2*Ih |
|---|---|---|---|---|---|---|---|
| EX.1 | 0.78 | 1.47 | 76.6 | 1.06 | 5.07 | 0.24 | 0.92 |
| EX.2 | 0.81 | 1.54 | 62.9 | 0.98 | 3.11 | 0.27 | 0.92 |
| EX.3 | 0.82 | 1.59 | 68.3 | 1.00 | 3.61 | 0.29 | 0.95 |
| EX.4 | 0.77 | 1.47 | 76.6 | 0.93 | 4.74 | 0.30 | 0.99 |
| EX.5 | 0.90 | 1.47 | 76.6 | 1.46 | 4.67 | 0.26 | 0.86 |
| EX.6 | 0.95 | 1.47 | 76.6 | 1.41 | 2.37 | 0.25 | 0.83 |
| EX.7 | 0.99 | 1.47 | 76.6 | 1.70 | 2.68 | 0.25 | 0.83 |
| EX.8 | 0.80 | 1.47 | 76.6 | 1.16 | 15.05 | 0.29 | 0.97 |
| EX.9 | 0.87 | 1.47 | 76.6 | 0.84 | 1.93 | 0.25 | 0.88 |

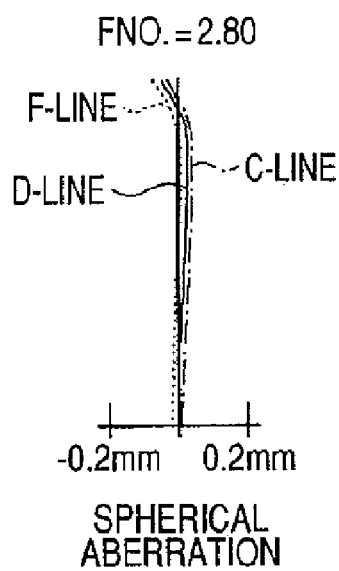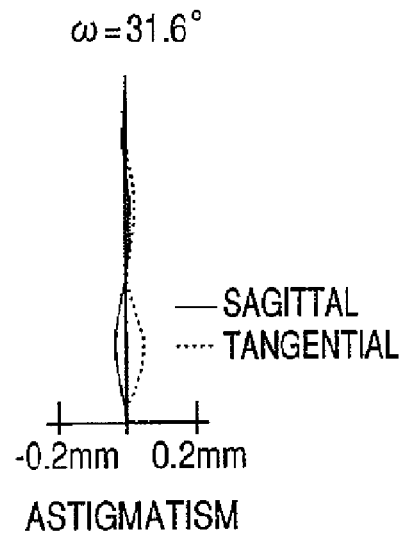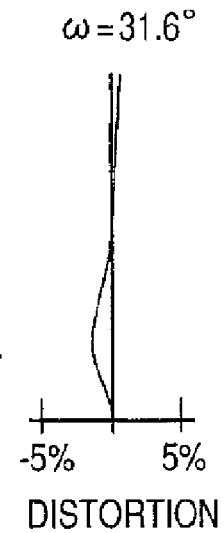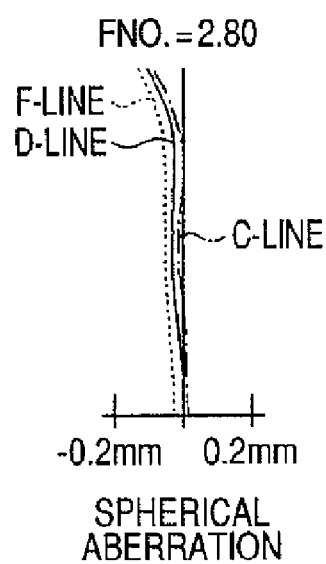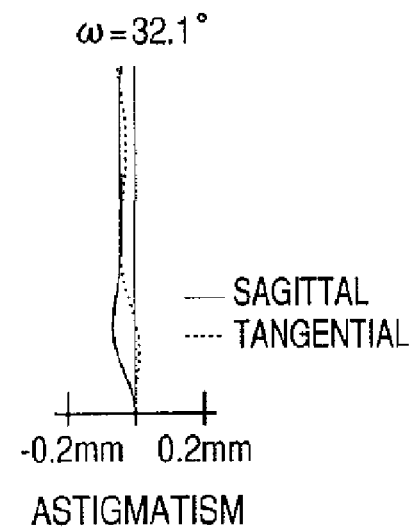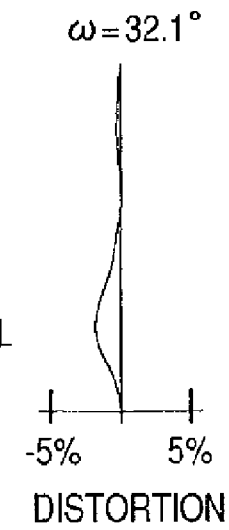

FNO.=2.80

SPHERICAL
ABERRATION

ω=31.4°

ASTIGMATISM

ω=31.4°

DISTORTION

FNO.=3.00

SPHERICAL
ABERRATION

ω=29.5°

ASTIGMATISM

ω=29.5°

DISTORTION

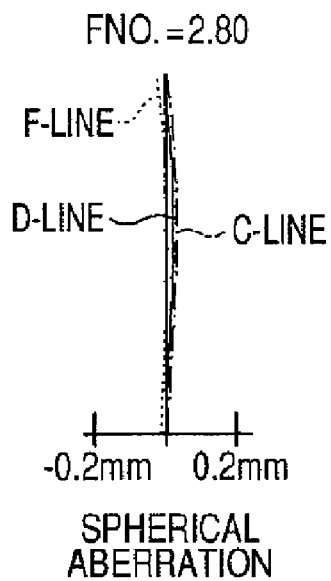
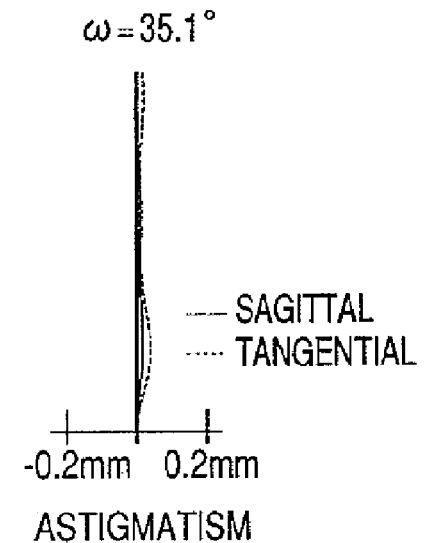
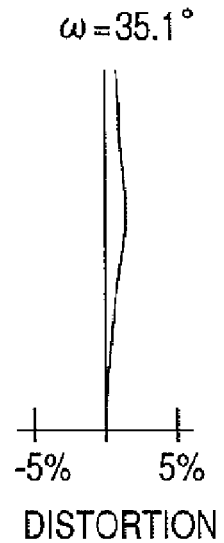
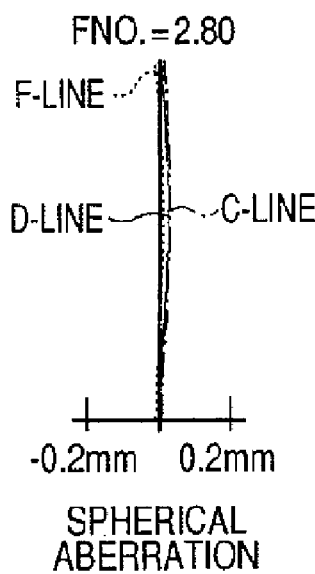
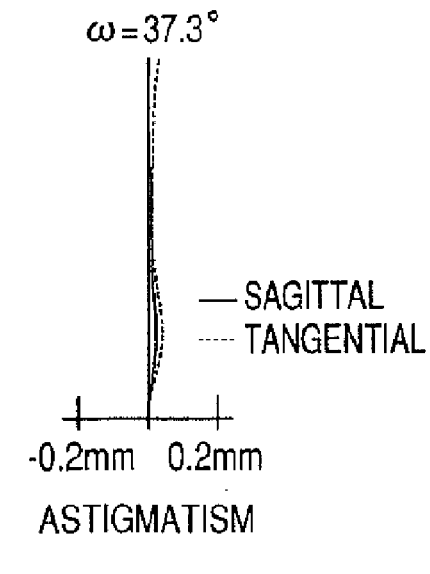

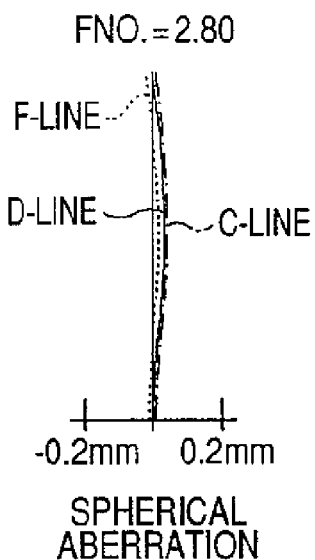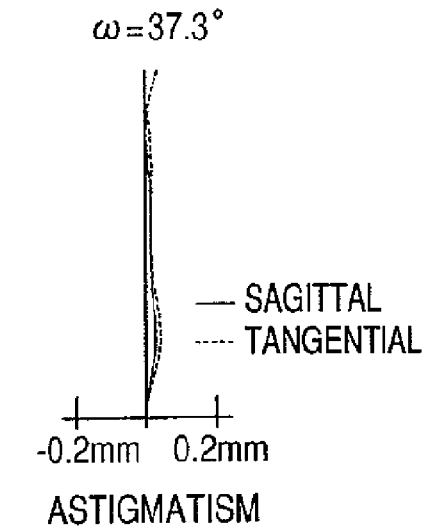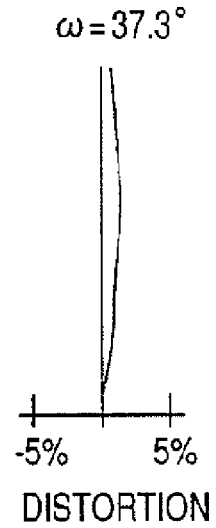
FIG. 35A  FIG. 35B  FIG. 35C
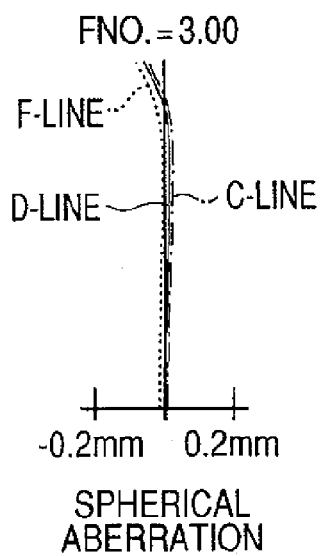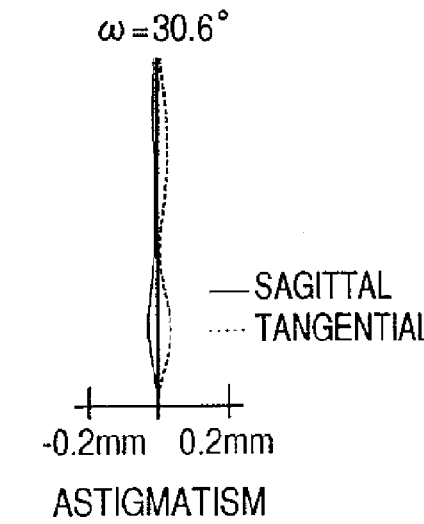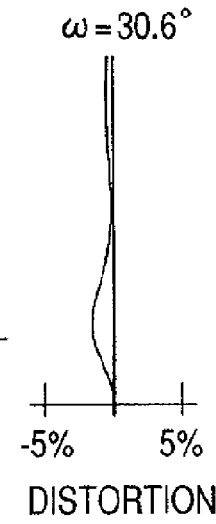
FIG. 36A  FIG. 36B  FIG. 36C

FNO.=2.80
SPHERICAL ABERRATION

ω=34.9°
ASTIGMATISM

ω=34.9°
DISTORTION

IMAGING LENS

This application is a Divisional of application Ser. No. 11/528,477, filed on Sep. 28, 2006, now U.S. Pat. No. 7,295,386 the entire contents of which are hereby incorporated by reference and for which priority is claimed under 35 U.S.C. § 120.

BACKGROUND OF THE INVENTION

1. Field of the Invention

The present invention relates to a fixed-focus imaging lens which can be suitably mounted on a small-sized imaging apparatus such as a digital camera using an image device such as a CCD (Charge Coupled Device) or a CMOS (Complementary Metal Oxide Semiconductor), a camera using a silver film, etc.

2. Description of Background Art

In recent years, with the popularization of personal computers over general homes or the like, digital still cameras (hereinafter referred to as "digital cameras" simply) capable of inputting image information of photographed scenes, persons, etc. into personal computers have been coming into wide use rapidly. With the sophistication of cellular phones, module cameras (portable module cameras) for inputting images have been often mounted on cellular phones.

In such an imaging apparatus, an imaging device such as a CCD or a CMOS is used. With recent development in miniaturization of imaging devices, such an imaging apparatus as a whole has been highly miniaturized. With higher pixel counts in imaging devices, higher resolution and higher performance have been developed.

For example, imaging lenses for use in such a miniaturized imaging apparatus have been disclosed in the following patent documents. JP-A-10-48516 and JP-A-2002-221659 disclose imaging lenses with three-lens configurations respectively. JP-A-2004-302057, JP-A-2005-24581, JP-A-2005-4027 and JP-A-2005-4028 disclose imaging lenses with four-lens configurations respectively. The imaging lens disclosed in JP-A-2004-302057 has a stop disposed between a second lens and a third lens from the object side. The imaging lens disclosed in JP-A-2005-24581 has a stop disposed the most closely to the object. The imaging lens disclosed in each of JP-A-2005-4027 and JP-A-2005-4028 has a stop disposed the most closely to the object or between a first lens and a second lens from the object side.

As described above, with the miniaturization and the higher pixel counts in recent imaging devices, particularly imaging lenses for digital cameras are requested to have higher resolution performance and to have a compact configuration. On the other hand, imaging lenses for portable module cameras have been heretofore chiefly requested to be low in cost and compact in configuration. Recently, also portable module cameras have showed a tendency to make their imaging devices higher in pixel counts. Thus, the imaging devices in the portable module cameras have been requested to have higher performance.

It is therefore desired to develop a wide variety of lenses comprehensively improved in cost, imaging performance and compact configuration. For example, it is desired to develop low-cost and high-performance imaging lens having compactness secured to be high enough to be mounted even in a portable module camera, and having performance high enough to be mounted even in a digital camera.

To meet these requests, for example, it is considered that the number of lenses is three or four in order to secure compactness and low cost, and aspheric surfaces are used aggressively in order to secure high performance. In this case, the aspheric surfaces contribute to compactness and high performance. However, the aspheric surfaces are disadvantageous in terms of manufacturing efficiency, and the cost is increased easily. It is therefore desired to take the manufacturing efficiency into consideration when the aspheric surfaces are used. The lenses according to the aforementioned patent documents have a three-lens or four-lens configuration using aspheric surfaces. However, they are insufficient, for example, in terms of compatibility between imaging performance and compactness.

SUMMARY OF THE INVENTION

An object of an illustrative, non-limiting embodiment of the invention is to provide an imaging lens showing high imaging performance in spite of its more compact configuration.

An imaging lens according to one aspect of the invention includes: in order from an object side of the imaging lens, a first lens having a convex surface on an object side and having a positive power; a second lens having a concave surface on the object side and having a negative power; a third lens having a positive power; and a fourth lens having a convex surface on the object side near a paraxial axis and having a meniscus shape; wherein the imaging lens satisfies all the following conditional expressions (1) to (5), where; f1 designates a focal length of the first lens, f designates a total focal length, n1 designates a refractive index of the first lens at the d-line, v1 designates an Abbe number of the first lens at the d-line, f2 designates a focal length of the second lens, and f3 designates a focal length of the third lens.

$$0.7 < f1/f < 1.1 \tag{1}$$

$$1.45 < n1 < 1.6 \tag{2}$$

$$v1 > 60 \tag{3}$$

$$0.8 < |f2/f| < 1.8 \tag{4}$$

$$1.9 < f3/f < 20 \tag{5}$$

An imaging lens according to one aspect of the invention can be made compact because the number of lenses is small to be four, while it is possible to obtain imaging performance high enough to support a digital camera which is, for example, mounted with a 5 million pixel imaging device. Specifically, since the first lens has a power satisfying the conditional expression (1), increase in size can be suppressed, and increase in spherical aberration can be suppressed. Further, since the first lens is formed out of a lens material satisfying the conditional expressions (2) and (3), chromatic aberration on the axis can be reduced. Further, since the imaging lens is arranged to satisfy the conditional expressions (4) and (5), high-order aberration such as spherical aberration or coma aberration can be corrected excellently, and the imaging lens can be made compact.

Preferably the imaging lens according to one aspect of the invention may be arranged to further satisfy the following conditional expression (6), where: bf designates a distance (on air basis) from an image-side surface of the fourth lens to an image plane, and TL designates a distance (on air basis) from an object-side surface of the first lens to the image plane. When the imaging lens is arranged to satisfy the conditional expression (6), more sufficient back focus can be secured $$bf/TL > 0.2 \tag{6}$$

Preferably the imaging lens according to one aspect of the invention may be arranged to further satisfy the following conditional expression (7), where: Ih designates a maximum image height in the image plane. When the imaging lens is arranged to satisfy the conditional expression (7), further miniaturization can be achieved.

$$TL/(2\times Ih)<1.1 \tag{7}$$

In the imaging lens according to one aspect of the invention, it is preferable that each of the first to fourth lenses includes at least one aspheric surface. Thus, high aberration performance can be obtained comparatively easily. When the first lens is composed of an optical lens and all the second to fourth lenses are composed of a resin material, reduction of various aberrations (particularly chromatic aberration) and weight saving can be achieved.

In the imaging lens according to one aspect of the invention, it is preferable that a stop is disposed between an object-side surface position on the optical axis in the first lens and an image-side surface position on the optical axis in the first lens. Thus, there is an advantage to shorten the total length.

BRIEF DESCRIPTION OF THE DRAWINGS

The features of the invention will appear more fully upon consideration of the exemplary embodiment of the invention, which are schematically set forth in the drawings, in which:

FIG. 11 is an explanatory table showing data about aspheric surfaces in the imaging lens of Example 1;

FIG. 12 is an explanatory table showing fundamental lens data in an imaging lens of Example 2;

FIG. 13 is an explanatory table showing data about aspheric surfaces in the imaging lens of Example 2;

FIG. 14 is an explanatory table showing fundamental lens data in an imaging lens of Example 3;

FIG. 15 is an explanatory table showing data about aspheric surfaces in the imaging lens of Example 3;

FIG. 16 is an explanatory table showing fundamental lens data in an imaging lens of Example 4;

FIG. 17 is an explanatory table showing data about aspheric surfaces in the imaging lens of Example 4;

FIG. 18 is an explanatory table showing fundamental lens data in an imaging lens of Example 5;

FIG. 19 is an explanatory table showing data about aspheric surfaces in the imaging lens of Example 5;

FIG. 20 is an explanatory table showing fundamental lens data in an imaging lens of Example 6;

FIG. 21 is an explanatory table showing data about aspheric surfaces in the imaging lens of Example 6;

FIG. 22 is an explanatory table showing fundamental lens data in an imaging lens of Example 7;

FIG. 23 is an explanatory table showing data about aspheric surfaces in the imaging lens of Example 7;

FIG. 24 is an explanatory table showing fundamental lens data in an imaging lens of Example 8;

FIG. 25 is an explanatory table showing data about aspheric surfaces in the imaging lens of Example 8;

FIG. 26 is an explanatory table showing fundamental lens data in an imaging lens of Example 9;

FIG. 27 is an explanatory table showing data about aspheric surfaces in the imaging lens of Example 9;

FIG. 28 is an explanatory table showing numeric values corresponding to expressions (1)-(7) in the imaging lenses of Examples 1-9;

FIGS. 29A-29C are aberration diagrams showing spherical aberration, astigmatism and distortion in the imaging lens of Example 1;

FIGS. 30A-30C are aberration diagrams showing spherical aberration, astigmatism and distortion in the imaging lens of Example 2;

FIGS. 33A-33C are aberration diagrams showing spherical aberration, astigmatism and distortion in the imaging lens of Example 5;

FIGS. 34A-34C are aberration diagrams showing spherical aberration, astigmatism and distortion in the imaging lens of Example 6;

FIGS. 35A-35C are aberration diagrams showing spherical aberration, astigmatism and distortion in the imaging lens of Example 7;

FIGS. 36A-36C are aberration diagrams showing spherical aberration, astigmatism and distortion in the imaging lens of Example 8.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, an imaging lens has a first lens having a convex surface on an object side and having a positive power, a second lens having a concave surface on the object side and having a negative power, a third lens having a positive power, and a fourth lens having a convex surface on the object side near a paraxial axis and having a meniscus shape. The first to fourth lenses are disposed in turn in order of increasing distance from an object. The imaging lens satisfies all the conditional expressions (1) to (5) so that the imaging lens can be made compact, and high resolution performance can be secured.

Exemplary embodiments of the invention will be described below in detail with reference to the drawings.

Figure 1:
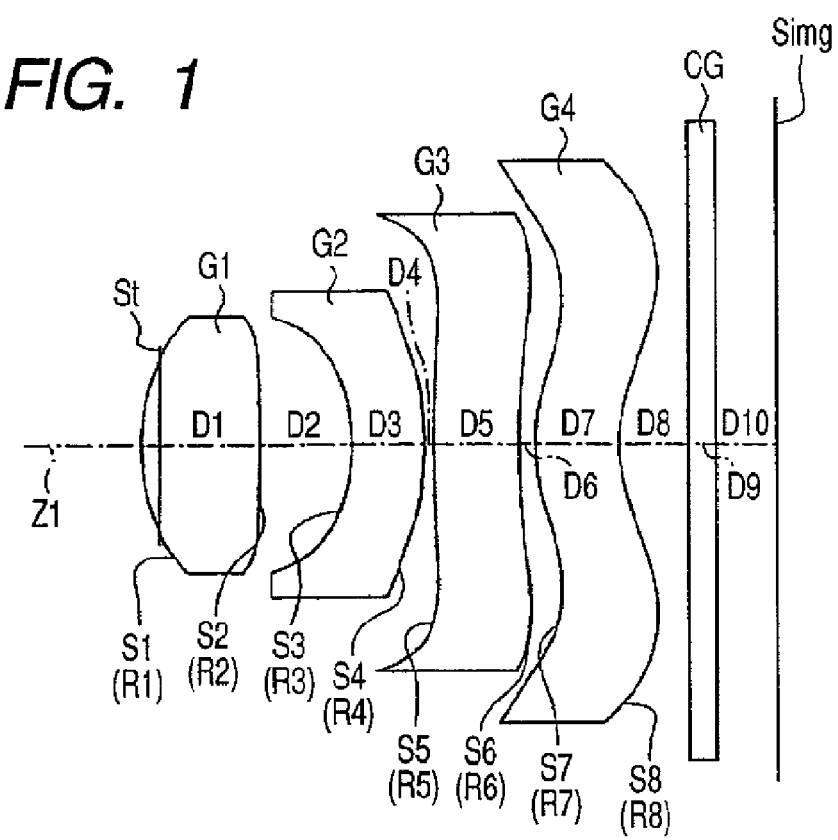
FIG. 1 is a sectional view showing a first configuration example in an imaging lens according to an embodiment of the invention, correspondingly to Example 1.

FIG. 1 shows a first configuration example of an imaging lens according to an embodiment of the invention. This configuration example corresponds to a lens configuration according to a first numeric value example (FIGS. 10 and 11) which will be described later. FIGS. 2-9 show second to ninth configuration examples according to this embodiment. The second configuration example corresponds to a lens configuration according to a second numeric value example (FIGS. 12 and 13) which will be described later. The third configuration example corresponds to a lens configuration according to a third numeric value example (FIGS. 14 and 15) which will be described later. The fourth configuration example corresponds to a lens configuration according to a fourth numeric value example (FIGS. 16 and 17) which will be described later. The fifth configuration example corresponds to a lens configuration according to a fifth numeric value example (FIGS. 18 and 19) which will be described later. The sixth configuration example corresponds to a lens configuration according to a sixth numeric value example (FIGS. 20 and 21) which will be described later. The seventh configuration example corresponds to a lens configuration according to a seventh numeric value example (FIGS. 22 and 23) which will be described later. The eighth configuration example corresponds to a lens configuration according to an eighth numeric value example (FIGS. 24 and 25) which will be described later. The ninth configuration example corresponds to a lens configuration according to a ninth numeric value example (FIGS. 26 and 27) which will be described later. In FIGS. 1-9, the reference sign Si designates an i-th surface of surfaces as constituents when the surface the closest to an object is regarded as a first surface, and the numeric value of the suffix i is increased sequentially as goes to the image side (imaging side). The reference sign Ri designates a curvature radius of the surface Si. The reference numeral Di designates spacing on an optical axis Z1 between the i-th surface Si and the i+1-th surface Si+1. The configuration examples have one and the same fundamental configuration. The configuration example of the imaging lens shown in FIG. 1 will be described below as a fundamental configuration. The configuration examples of FIGS. 2-9 will be also described in accordance with necessity.

This imaging lens is intended to be mounted and used on a portable module camera, a digital camera, etc. using an imaging device such as a CCD or a CMOS. The imaging lens has a configuration in which a stop St, a first lens G1, a second lens G2, a third lens G3 and a fourth lens G4 are disposed along the optical axis Z1 in order of increasing distance from an object. An imaging device (not shown) such as a CCD is disposed in an imaging surface (image surface) $S_{img}$ of the imaging lens. A cover glass CC for protecting the image surface is disposed near the image surface of the imaging device. Not only the cover glass CG but also other optical members such as an infrared cut filter, a low pass filter, etc, may be disposed between the fourth lens G4 and the imaging surface (image surface).

The first lens G1 has a meniscus shape having a convex surface on the object side near a paraxial axis (near the optical axis), and has a positive power. However, as shown in the sixth or ninth configuration example, the first lens G1 may have a double-convex shape near the paraxial axis. For example, it is desired that at least one of an object-side surface S1 and an image-side surface S2 of the first lens G1 is aspheric. Especially it is desired that both the surfaces S1 and S2 are aspheric. Such a first lens G1 is composed of a low-dispersion optical glass. In order to make an incident angle on the imaging device as small as possible, it is advantageous to dispose the stop St in a position as close to the object as possible. However, when the stop St is located to be closer to the object than the surface S1, the distance between the stop St and the surface S1 is added to the optical path length. This is disadvantageous in miniaturization (low profile) of the total configuration. For these reasons, it is desired that the stop St is disposed between the surface S1 and the surface S2 on the optical axis Z1.

The second lens G2 has a meniscus shape having a concave surface on the object side near the paraxial axis, and has a negative power. However, as shown in the ninth configuration example, the second lens G2 may have a double-concave shape near the paraxial axis. For example, it is desired that at least one of an object-side surface S3 and an image-side surface S4 of the second lens G2 is aspheric. Especially it is desired that both the surfaces S3 and S4 are aspheric The third lens G3 has a meniscus shape having a convex surface on the object side near the paraxial axis, and has a positive power. For example, it is desired that at least one of an object-side surface S5 and an image-side surface S6 of the third lens G3 is aspheric. Especially it is desired that the third lens G3 has an effective diameter range where the surface S5 is an aspheric surface with a positive power weakened in a position closer to the periphery, and the surface S6 is an aspheric surface with a negative power weakened in a position closer to the periphery. That is, it is desired that the object-side surface S5 is an aspheric surface having a convex shape near the paraxial axis but a concave shape near the periphery and the image-side surface S6 is an aspheric surface having a concave shape near the paraxial axis but a convex shape in the periphery.

The fourth lens G4 has a meniscus shape having a convex surface on the object side near the paraxial axis, and has a positive power by way of example. For example, it is desired that at least one of an object-side surface S7 and an image-side surface S8 of the fourth lens G4 is aspheric. Especially it is desired that the fourth lens G4 has an effective diameter range where the surface S7 is an aspheric surface with a positive power weakened in a position closer to the periphery, and the surface S8 is an aspheric surface with a negative power weakened in a position closer to the periphery. That is, it is desired that the object-side surface S7 is an aspheric surface having a convex shape near the paraxial axis but a concave shape near the periphery and the image-side surface S8 is an aspheric surface having a concave shape near the paraxial axis but a convex shape in the periphery.

All the second to fourth lenses G2 to G4 each having a more complicated shape and a larger size than the first lens G1 are composed of a resin material. As a result, the complicated aspheric shapes can be formed with high precision while the imaging lens as a whole can be made lighter in weight.

Further, the imaging lens is arranged to satisfy the all the following conditional expressions (1) to (5). Assume that f1 designates the focal length of the first lens G1, f designates the total focal length, n1 designates the refractive index of the first lens G1 at the d-line, ν1 designates the Abbe number of the first lens G1 at the d-line, f2 designates the focal length of the second lens G2, and f3 designates the focal length of the third lens G3.

$$0.7 < f1/f < 1.1 \quad (1)$$

$$1.45 < n1 < 1.6 \quad (2)$$

$$\nu 1 > 60 \quad (3)$$

$$0.8 < |f2/f| < 1.8 \quad (4)$$

$$1.9 < f3/f < 20 \quad (5)$$

It is preferable that the imaging lens is arranged to further satisfy the following conditional expression (6). Assume that bf designates the distance (on air basis) from the image-side surface S7 of the fourth lens G4 to the imaging surface $S_{img}$, and TL designates the distance (on air basis) from the object-side surface S1 of the first lens G1 to the imaging surface $S_{img}$.

$$bf/TL > 0.2 \quad (6)$$

It is preferable that the imaging lens is arranged to further satisfy the following conditional expression (7). Assume that Ih designates a maximum image height in the imaging surface.

$$TL/(2 \times Ih) < 1.1 \quad (7)$$

Next, the operation and effect of the imaging lens configured thus according to the embodiment will be described.

In the imaging lens according to the invention, the lens surfaces of the first to fourth lenses G1 to G4 are formed into aspheric shapes defined by even-order and odd-order aspheric coefficients respectively. In this manner, the imaging lens can be made compact because the number of lenses is four, while it is possible to obtain imaging performance high enough to support a digital camera which is, for example, mounted with a 5 million pixel imaging device. Specifically, since the first lens G1 has a power satisfying the conditional expression (1), increase in size can be suppressed, and increase in spherical aberration can be suppressed. Further, since the first lens G1 is formed out of an optical glass satisfying the conditional expressions (2) and (3), chromatic aberration on the axis can be reduced. Further, since the imaging lens is arranged to satisfy the conditional expressions (4) and (5), high-order aberration such as spherical aberration or coma aberration can be corrected excellently, and the imaging lens can be made compact. Further, when the imaging lens is arranged to satisfy the conditional expressions (6) and (7), further miniaturization can be achieved while securing sufficient back focus. Since the stop St is disposed between the surface S1 and the surface S2 on the optical axis Z1, the total length of the imaging lens can be shortened. The meanings of the conditional expressions (1) to (7) will be described below in detail.

The conditional expression (1) expresses an optimum range of a ratio (f1/f) of the power (1/f1) of the first lens G1 to the total power (1/f) of the system. When the power distribution of the first lens G1 is optimized, correction of various aberrations and securement of sufficient back focus can be performed in a balanced manner. Here, when the ratio is lower than the lower limit of the conditional expression (1) so that the positive power of the first lens G1 becomes too strong, correction of spherical aberration becomes insufficient, and the system as a whole becomes large in size. On the contrary, when the ratio is higher than the upper limit of the conditional expression (1) so that the positive power of the first lens G1 becomes too weak, sufficient back focus cannot be secured.

The conditional expressions (2) and (3) define the dispersion at the d-line in the optical glass used as the first lens G1. When the conditional expressions (2) and (3) are satisfied, the dispersion can be suppressed to reduce the chromatic aberration on the axis.

The conditional expression (4) expresses an optimum range of a ratio (f2/f) of the power (1/f2) of the second lens G2 to the total power (1/f) of the system. When the power distribution of the second lens G2 is optimized, various aberrations can be corrected excellently. Here, when the ratio is lower than the lower limit of the conditional expression (4) so that the negative power of the second lens G2 becomes too strong, high-order aberration is increased. On the contrary, when the ratio is higher than the upper limit of the conditional expression (4) so that the negative power of the second lens G2 becomes too weak, correction of spherical aberration or coma aberration becomes chiefly difficult. Especially when the imaging lens is arranged to satisfy the following conditional expression (8), aberrations can be corrected more excellently.

$$0.9 < |f2/f| < 1.1 \quad (8)$$

The conditional expression (5) expresses an optimum range of a ratio (f3/f) of the power (1/f3) of the third lens G3 to the total power (1/f) of the system. When the power distribution of the third lens G3 is optimized, correction of various aberrations and securement of sufficient back focus can be performed in a balanced manner. Here, when the ratio is lower than the lower limit of the conditional expression (5) so that the positive power of the third lens G3 becomes too strong, sufficient back focus cannot be secured. On the contrary, when the ratio is higher than the upper limit of the conditional expression (5) so that the positive power of the third lens G3 becomes too weak, it is difficult to achieve sufficient aberration correction. Especially when the following conditional expression (9) is satisfied, securement of sufficient back focus and excellent correction of aberrations can be performed in a balanced manner.

$$3.0 < f3/f < 10 \quad (9)$$

The conditional expressions (6) and (7) define compactness of the imaging lens as a whole. When the conditional expression (6) is satisfied, more sufficient back focus can be secured. Especially when the following conditional expression (10) is satisfied, much more sufficient back focus can be secured. When the conditional expression (7) is satisfied, further miniaturization can be achieved. Especially when the following conditional expression (11) is satisfied, much further miniaturization can be achieved.

$$bf/TL > 0.23 \quad (10)$$

$$TL/(2 \times Ih) < 1.0 \quad (11)$$

Thus, in the imaging lens according to the embodiment, the first to fourth lenses G1 to G4 are arranged as described above, and predetermined conditional expressions are satisfied. Accordingly, the imaging lens can be made compact, and high imaging performance can be secured.

Next, specific numeric value examples of the imaging lens according to the embodiment will be described. First to ninth numeric value examples (Examples 1 to 9) will be described below with the first numeric value example as fundamental representative.

Figure 2:
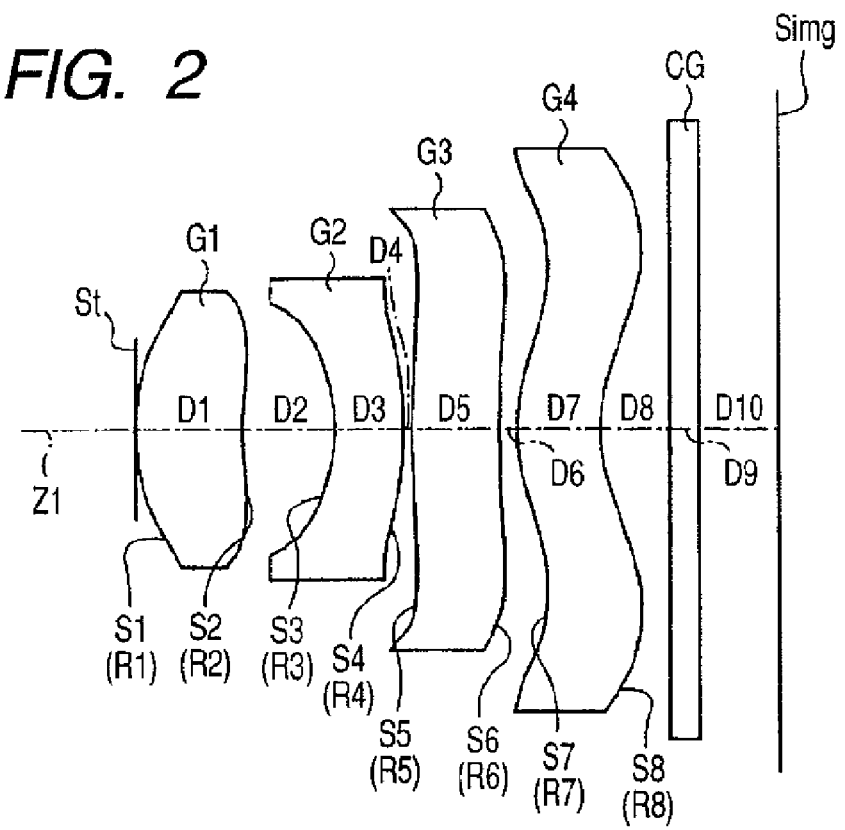
FIG. 2 is a sectional view showing a second configuration example in an imaging lens according to an embodiment of the invention, correspondingly to Example 2.
Figure 3:
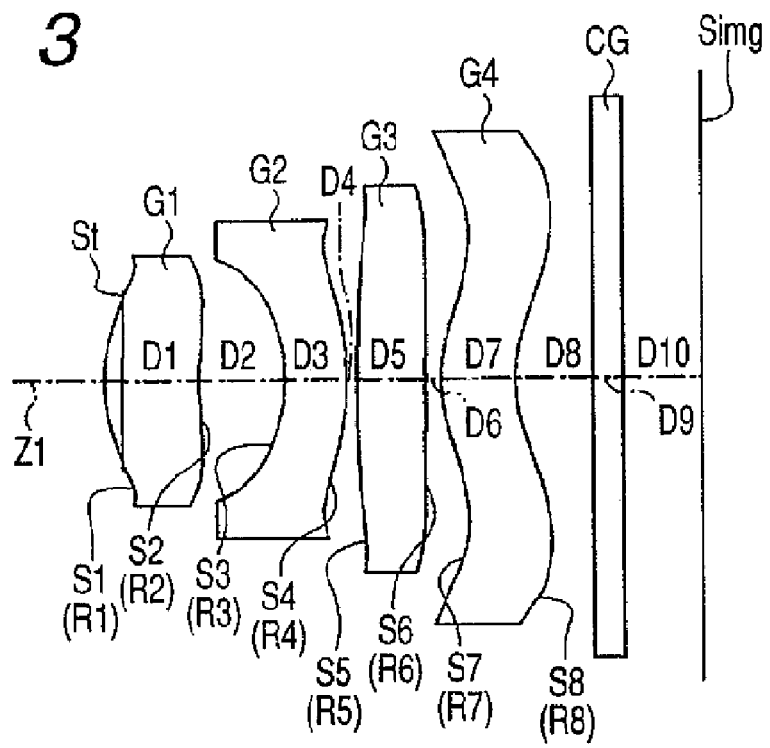
FIG. 3 is a sectional view showing a third configuration example in an imaging lens according to an embodiment of the invention, correspondingly to Example 3.
Figure 4:
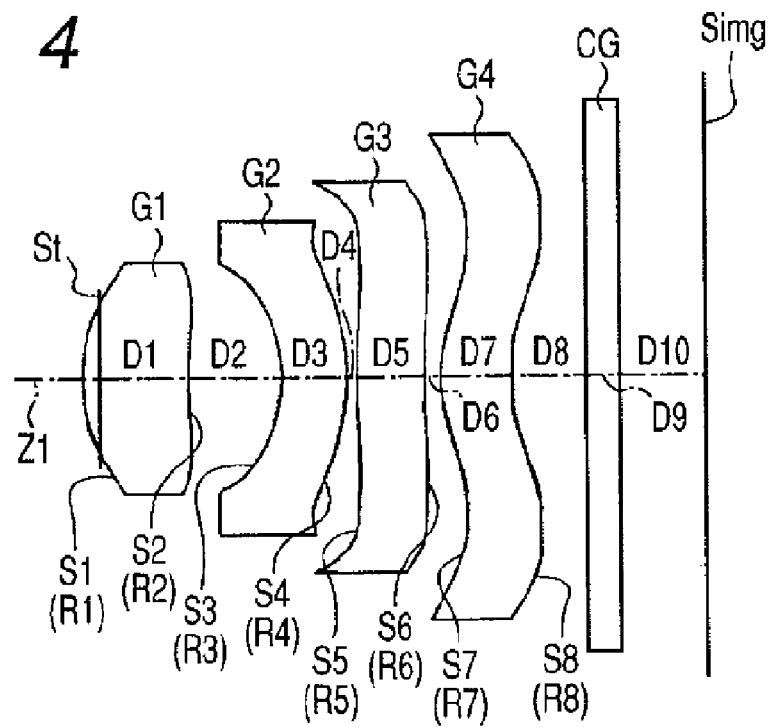
FIG. 4 is a sectional view showing a fourth configuration example in an imaging lens according to an embodiment of the invention, correspondingly to Example 4.
Figure 5:
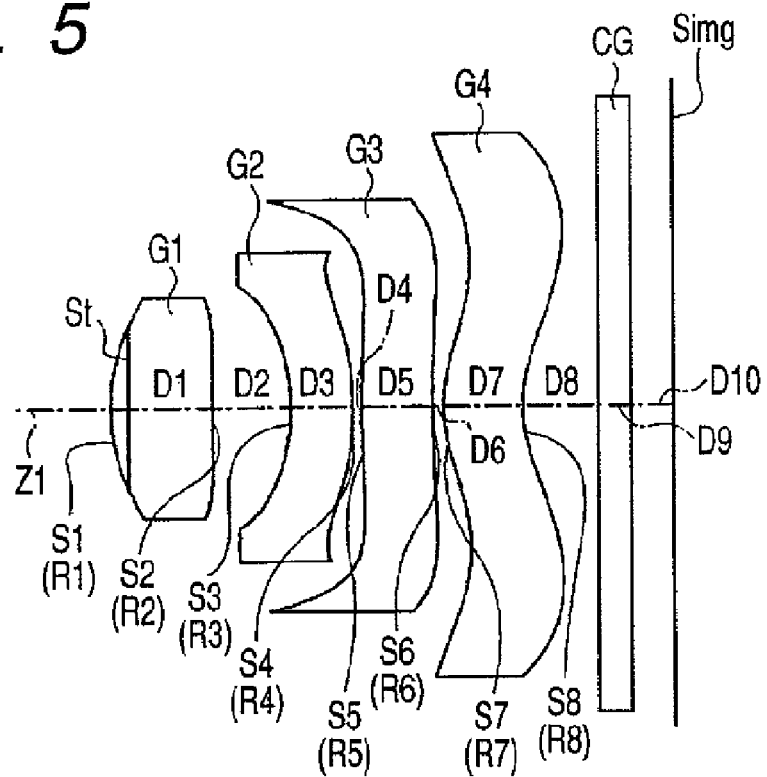
FIG. 5 is a sectional view showing a fifth configuration example in an imaging lens according to an embodiment of the invention, correspondingly to Example 5.
Figure 6:
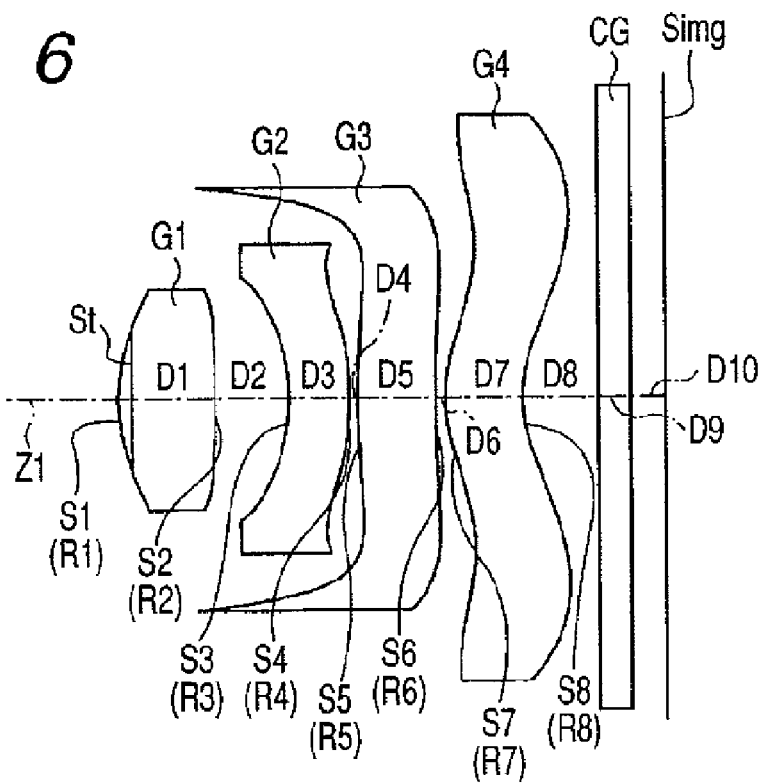
FIG. 6 is a sectional view showing a sixth configuration example in an imaging lens according to an embodiment of the invention, correspondingly to Example 6.
Figure 7:
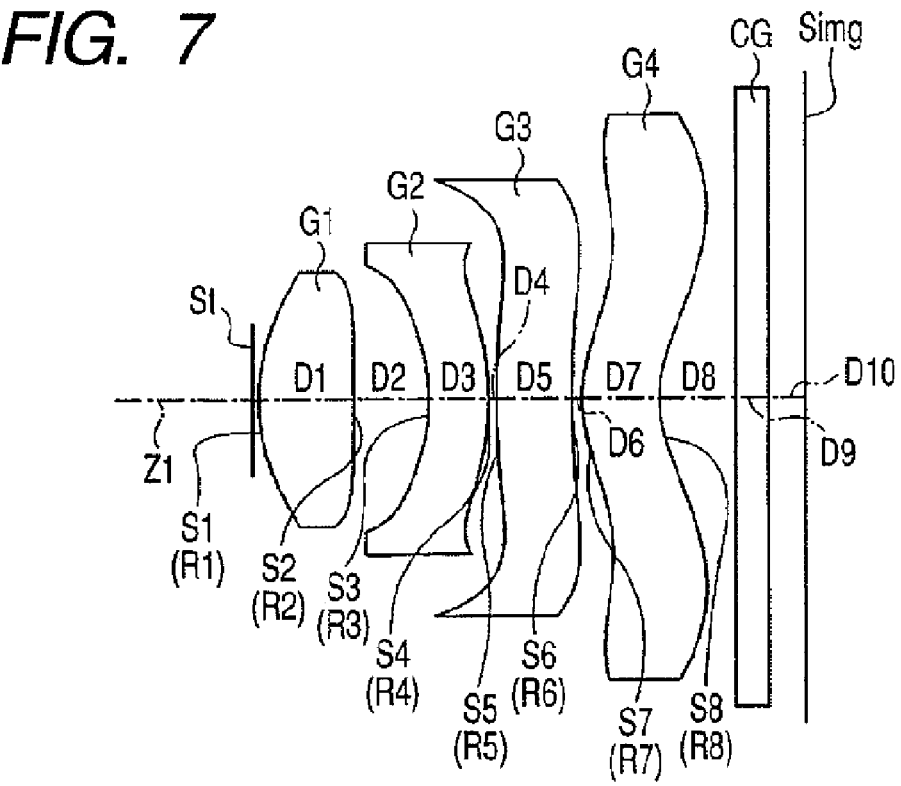
FIG. 7 is a sectional view showing a seventh configuration example in an imaging lens according to an embodiment of the invention, correspondingly to Example 7.
Figure 8:
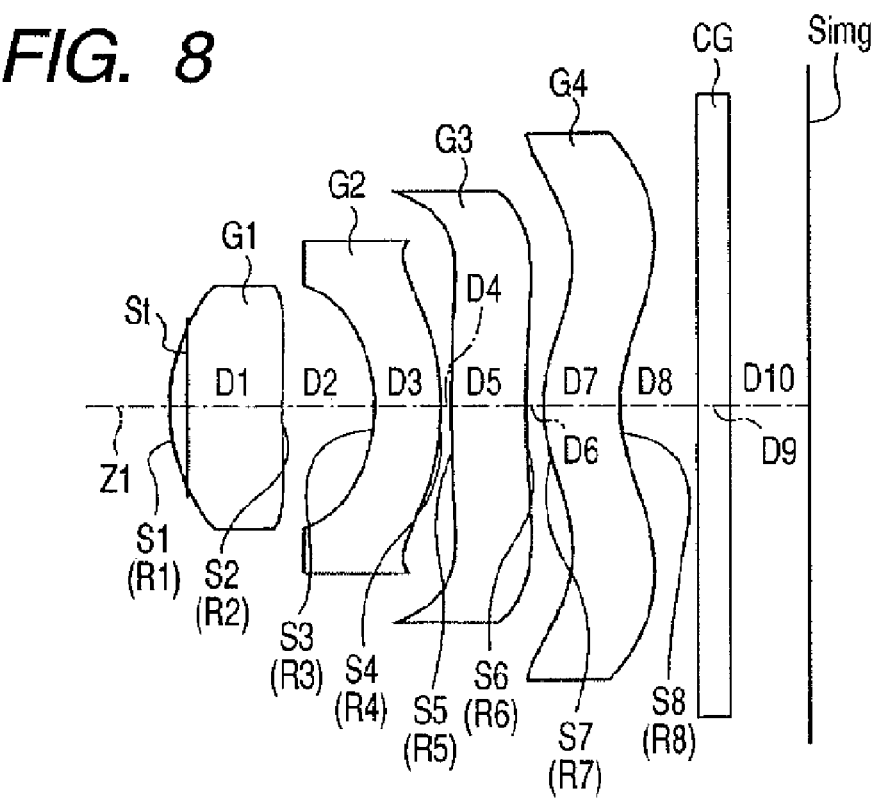
FIG. 8 is a sectional view showing an eighth configuration example in an imaging lens according to an embodiment of the invention, correspondingly to Example 8.
Figures 9, 10:
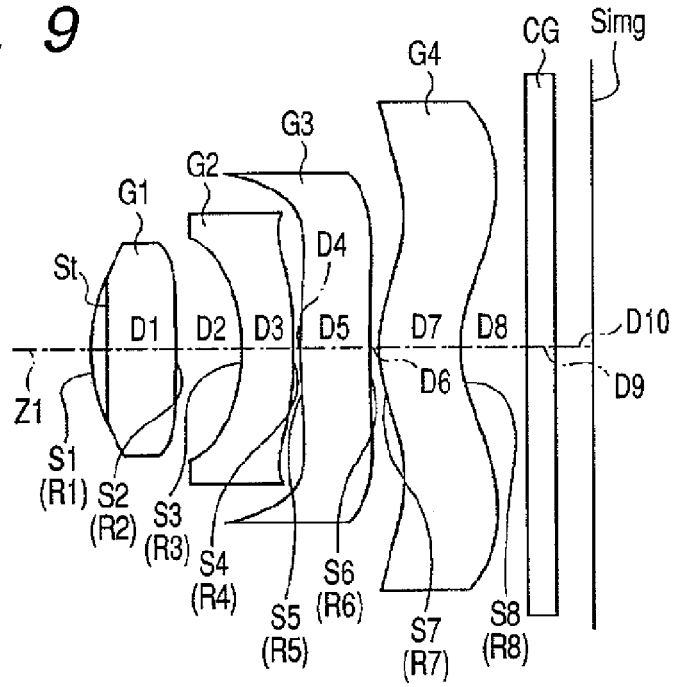
FIG. 9 is a sectional view showing a ninth configuration example in an imaging lens according to an embodiment of the invention, correspondingly to Example 9.
FIG. 10 is an explanatory table showing fundamental lens data in an imaging lens of Example 1.

FIGS. 10 and 11 show specific lens data (Example 1) corresponding to the configuration of the imaging lens shown in FIG. 1. FIG. 10 shows fundamental lens data, and FIG. 11 show data about aspheric shapes. Similarly FIGS. 12 and 13 show specific lens data (Example 2) corresponding to the second configuration example (FIG. 2). Similarly FIGS. 14 and 15 show specific lens data (Example 3) corresponding to the third configuration example (FIG. 3). Similarly FIGS. 16 and 17 show specific lens data (Example 4) corresponding to the fourth configuration example (FIG. 4). Similarly FIGS. 18 and 19 show specific lens data (Example 5) corresponding to the fifth configuration example (FIG. 5). Similarly FIGS. 20 and 21 show specific lens data (Example 6) corresponding to the sixth configuration example (FIG. 6). Similarly FIGS. 22 and 23 show specific lens data (Example 7) corresponding to the seventh configuration example (FIG. 7). Similarly FIGS. 24 and 25 show specific lens data (Example 8) corresponding to the eighth configuration example (FIG. 8). Similarly FIGS. 26 and 27 show specific lens data (Example 9) corresponding to the ninth configuration example (FIG. 9).

In fundamental lens data shown in FIG. 10, the field of the surface number Si shows the surface number of an i-th surface of surfaces as constituents correspondingly to the sign Si of the imaging lens shown in FIG. 1 when the surface the closest to an object except for the stop St is regarded as a first surface, and the numeric value of the suffix i (i=1 to 10) is increased sequentially as goes to the image side. The field of curvature radius R1 shows the value of the curvature radius of the i-th surface from the object side, correspondingly to the reference sign Ri shown in FIG. 1. Similarly in the field of the surface spacing Di, spacing on an optical axis between the i-th surface Si and the i+1-th surface Si+1 from the object is shown correspondingly to the reference sign shown in FIG. 1. Values of the curvature radius Ri and the surface spacing Di are expressed by units of millimeters (mm). The fields of Ndj and vdj show values of the refractive index and the Abbe number of a j-th (j=1 to 5) lens element including the cover glass CG from the object side at the d-line (587.6 nm). The values of the curvature radii R9 and R10 of the two surfaces of the cover glass CG are 0 (zero). This means the surfaces are flat. The field of the surface spacing Di of the stop shows the distance (mm) between the surface S1 and the stop St on the optical axis. The minus sign means the stop St is located on the image side of the surface S1. Various data including the focal length f (mm) of the system as a whole, the F number (FNO.), the back focus bf (mm), the distance (on air basis) TL (mm) between the object-side surface S1 of the first lens G1 and the imaging surface $S_{img}$, and the maximum image height Ih (mm) in the imaging surface are shown together in the margin of FIG. 10.

In FIG. 10, the sign * added to the left of the surface number Si designates the lens surface is an aspheric surface. In each example, all the opposite surfaces of the first to fourth lenses G1 to G4 are aspheric surfaces. In the fundamental lens data, numeric values of curvature radii near the optical axis (near the paraxial axis) are shown as the curvature radii of these aspheric surfaces.

In each numeric value of aspheric data in FIG. 11, the sign "E" designates the numeric value following the sign "E" is an "exponent" in base 10, and the numeric value followed by the sign "E" is multiplied by the numeric value expressed by an exponential function in base 10. For example, "1.0E-02" designates "$1.0 \times 10^{-2}$".

The aspheric data include values of coefficients Ai and K in an equation of an aspheric surface shape expressed by the following equation (ASP). More specifically, Z designates the length (mm) of a perpendicular line dropped on a tangent plane (a plane perpendicular to the optical axis) of a summit of an aspheric surface from a point on the aspheric surface located at height h from the optical axis.

$$Z = C \cdot h^2 / \{1 + (1 - K \cdot C^2 \cdot h^2)^{1/2}\} + \Sigma A_i \cdot h^i \quad \text{(ASP)}$$

where:
Z: depth (mm) of aspheric surface
h: distance (height) (mm) from optical axis to lens surface
K: eccentricity
C: paraxial curvature=1/R
(R: paraxial curvature radius)
$A_i$: i-order (i is an integer not smaller than 3) aspheric coefficient In each of Examples 1-9, all the surfaces of the first to fourth lenses G1 to G4 are aspheric. As for the aspheric coefficient $A_i$, 3 to 10 order coefficients $A_3$ to $A_{10}$ are used effectively. In the third to eighth surfaces in Example 6 and the second to eighth surfaces in Example 7, 3 to 16 order coefficients $A_3$ to $A_{16}$ are used effectively.

FIG. 28 shows values corresponding to the conditional expressions (1) to (7) in the respective examples together. As shown in FIG. 28, all the values in the examples fall within the numeric value ranges of the conditional expressions (1) to (7).

Figure 31A:
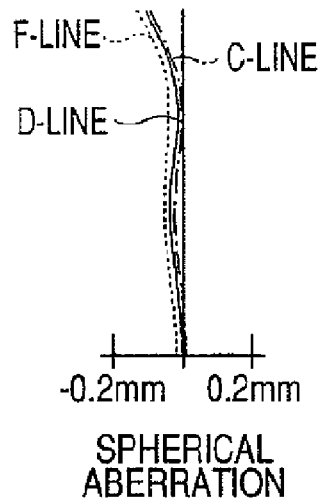
FIGS. 31A-31C are aberration diagrams showing spherical aberration, astigmatism and distortion in the imaging lens of Example 3.
Figure 31B:
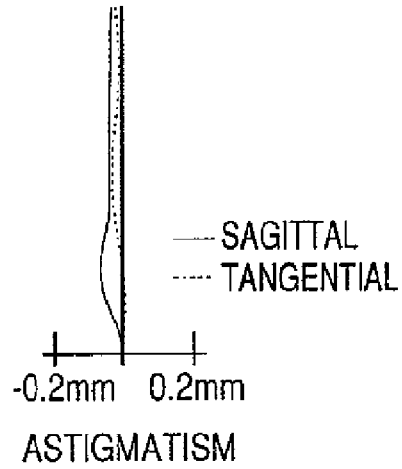
Figure 31C:
Figure 32A:
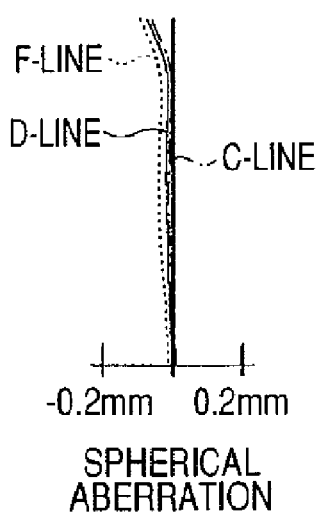
FIGS. 32A-32C are aberration diagrams showing spherical aberration, astigmatism and distortion in the imaging lens of Example 4.
Figure 32B:
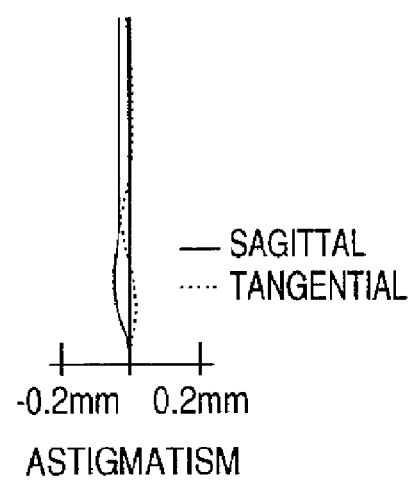
Figure 32C:
Figure 37A:
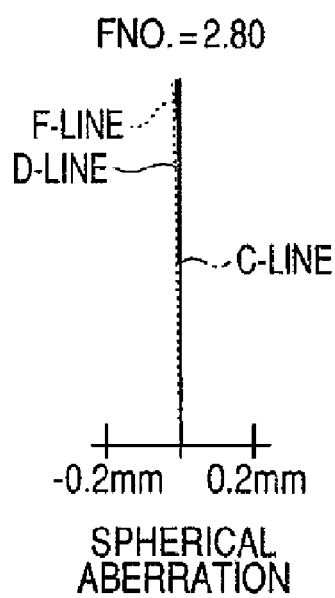
FIGS. 37A-37C are aberration diagrams showing spherical aberration, astigmatism and distortion in the imaging lens of Example 9.
Figure 37B:
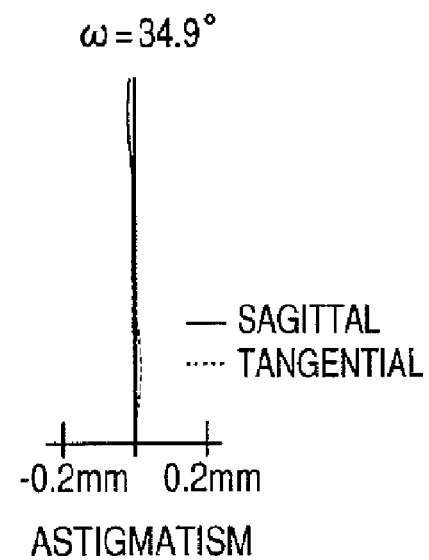
Figure 37C:
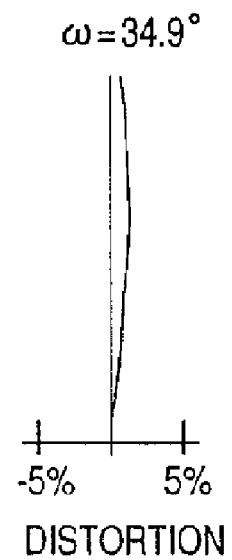

FIGS. 29A-29C show spherical aberration, astigmatism and distortion (distortional aberration) in the imaging lens of Example 1 respectively. Each aberration diagram shows aberration at the d-line as reference wavelength. The spherical aberration diagram also shows aberrations at the F-line (wavelength 486.1 nm) and the C-line (wavelength 656.3 nm). In the astigmatism diagram, the solid line shows aberration in a sagittal direction, and the broken line shows aberration in a tangential direction. Similarly, FIGS. 30A-30C show various aberrations in Example 2. Similarly, FIGS. 31A-31C show various aberrations in Example 3. Similarly, FIGS. 32A-32C show various aberrations in Example 4. Similarly, FIGS. 33A-33C show various aberrations in Example 5. Similarly, FIGS. 34A-34C show various aberrations in Example 6. Similarly, FIGS. 35A-35C show various aberrations in Example 7. Similarly, FIGS. 36A-36C show various aberrations in Example 8. Similarly, FIGS. 37A-37C show various aberrations in Example 9.

As is apparent from the aforementioned lens data and the aforementioned aberration diagrams, extremely excellent aberration performance is exhibited in each example. In addition, the total length is made compact.

The invention has been described above with some embodiments and examples. The invention is not limited to the embodiments and examples, but various modifications can be made. For example, the values of the curvature radius, the surface spacing and the refractive index of each lens element are not limited to the values shown in the corresponding numeric value example, but may be other values. In the aforementioned embodiments and examples, all the opposite surfaces of the first to fourth lenses are formed into aspheric surfaces, but they are not limited thereto.

The present application claims foreign priority based on Japanese Patent Application Nos. JP2005-283947 and JP2006-163875, filed Sep. 29 of 2005 and Jun. 13 of 2006, respectively, the contents of which is incorporated herein by reference.

What is claimed is:
1. An imaging lens comprising: in order from an object side of the imaging lens,
a first lens having a convex surface on the object side and having a positive power;
a second lens having a concave surface on the object side and having negative power;
a third lens having positive power; and
a fourth lens having a convex surface on the object side near a paraxial axis and having a meniscus shape, wherein the imaging lens has an air distance between the first lens and the second lens, and the imaging lens satisfies conditional expression (5):

$$1.9 < f3/f < 20 \quad (5)$$

wherein f designates a total focal length; and f3 designates a focal length of the third lens, and
   wherein each of the second to fourth lenses is made of a resin material,
   the imaging lens further satisfying conditional expression (1):

$$0.7 < f1/f < 1.1 \quad (1)$$

wherein f1 designates a focal length of the first lens.

2. The imaging lens according to claim 1, further satisfying conditional expressions (2) and (3):

$$1.45 < n1 < 1.6 \quad (2)$$

$$v1 > 60 \quad (3)$$

wherein n1 designates a refractive index of the first lens at the d-line; and v1 designates an Abbe number of the first lens at the d-line.

3. The imaging lens according to claim 1, further satisfying conditional expression (4):

$$0.8 < |f2/f| < 1.8 \quad (4)$$

wherein f2 designates a focal length of the second lens.

4. An imaging lens comprising: in order from an object side of the imaging lens,
   a first lens having a convex surface on the object side and having a positive power;
   a second lens having a concave surface on the object side and having a negative power;
   a third lens having a positive power; and
   a fourth lens having a convex surface on the object side near a paraxial axis and having a meniscus shape,
   wherein the imaging lens satisfies conditional expressions (1) and (5):

$$0.7 < f1/f < 1.1 \quad (1)$$

$$1.9 < f3/f < 20 \quad (5)$$

wherein f1 designates a focal length of the first lens; f designates a total focal length; and f3 designates a focal length of the third lens, and
   wherein each of the second to fourth lenses is made of a resin material.

5. The imaging lens according to claim 4, further satisfying conditional expressions (2) and (3):

$$1.45 < n1 < 1.6 \quad (2)$$

$$v1 > 60 \quad (3)$$

wherein n1 designates a refractive index of the first lens at the d-line; and v1 designates an Abbe number of the first lens at the d-line.

6. The imaging lens according to claim 4, further satisfying conditional expression (4):

$$0.8 < |f2/f| < 1.8 \quad (4)$$

wherein f2 designates a focal length of the second lens.

7. The imaging lens according to claim 4, wherein each of the second to fourth lenses includes at least one aspheric surface.

8. The imaging tens according to claim 4, wherein the first lens is made of an optical glass.

9. An imaging lens comprising: in order from an object side of the imaging lens,
   a first lens having a convex surface on the object side and having a positive power;
   a second lens having a concave surface on the object side and having a negative power;
   a third lens having a positive power; and
   a fourth lens having a convex surface on the object side near a paraxial axis and having a meniscus shape,
   wherein the imaging lens has an air distance between the first lens and the second lens, and the imaging lens satisfies conditional expression (6):

$$1.9 < f3/f \leq 4.74 \quad (6)$$

wherein f designates a total focal length; and f3 designates a focal length of the third lens,
   the imaging lens further satisfying conditional expression (1):

$$0.7 < f1/f < 1.1 \quad (1)$$

wherein f1 designates a focal length of the first lens.

10. The imaging lens according to claim 9, further satisfying conditional expressions (2) and (3):

$$1.45 < n1 < 1.6 \quad (2)$$

$$v1 > 60 \quad (3)$$

wherein n1 designates a refractive index of the first lens at the d-line; and v1 designates an Abbe number of the first lens at the d-line.

11. The imaging lens according to claim 9, further satisfying conditional expression (4):

$$0.8 < |f2/f| < 1.8 \quad (4)$$

wherein f2 designates a focal length of the second lens.

12. An imaging lens comprising: in order from an object side of the imaging lens,
   a first lens having a convex surface on the object side and having a positive power;
   a second lens having a concave surface on the object side and having a negative power;
   a third lens having a positive power; and
   a fourth lens having a convex surface on the object side near a paraxial axis and having a meniscus shape,
   wherein the imaging lens satisfies conditional expressions (1) and (6):

$$0.7 < f1/f < 1.1 \quad (1)$$

$$1.9 < f3/f \leq 4.74 \quad (6)$$

wherein f1 designates a focal length of the first lens; f designates a total focal length; and f3 designates a focal length of the third lens.

13. The imaging lens according to claim 12, further satisfying conditional expressions (2) and (3):

$$1.45 < n1 < 1.6 \quad (2)$$

$$v1 > 60 \quad (3)$$

wherein n1 designates a refractive index of the first tens at the d-line; and v1 designates an Abbe number of the first lens at the d-line.

14. The imaging lens according to claim 12, further satisfying conditional expression (4):

$$0.8 < |f2/f| < 1.8 \qquad (4)$$

wherein f2 designates a focal length of the second lens.

15. The imaging lens according to claim 12, wherein each of the second to fourth lenses includes at least one aspheric surface

16. The imaging lens according to claim 12, wherein each of the second to fourth lenses is made of a resin material.

17. The imaging lens according to claim 12, wherein the first lens is made of an optical glass.

\* \* \* \* \*